Oct. 23, 1962 R. R. GREENE ET AL 3,059,582
MOTOR PUMP UNIT
Filed April 24, 1959 6 Sheets-Sheet 3

Inventors
Robert R. Greene
John H. Harker 2nd
Harold A. Lockhart
By Mann, Brown and McWilliams
Attys.

Oct. 23, 1962  R. R. GREENE ET AL  3,059,582
MOTOR PUMP UNIT

Filed April 24, 1959  6 Sheets-Sheet 4

Inventors
Robert R. Greene,
John H. Harker and
Harold A. Lockhart.
By Mann, Brown and McWilliams
Attys.

Oct. 23, 1962    R. R. GREENE ET AL    3,059,582
MOTOR PUMP UNIT
Filed April 24, 1959    6 Sheets-Sheet 5

Inventors
Robert R. Greene
John H. Harker and
Harold A. Lockhart
By Mann, Brown and McWilliams
Attys.

Oct. 23, 1962   R. R. GREENE ET AL   3,059,582
MOTOR PUMP UNIT
Filed April 24, 1959   6 Sheets-Sheet 6

Inventors
Robert R. Greene
John H. Harker and
Harold A. Lockhart.
By Mann, Brown and McWilliams.
Attys.

United States Patent Office 3,059,582
Patented Oct. 23, 1962

3,059,582
MOTOR PUMP UNIT
Robert R. Greene, Chicago, John H. Harker, Park Ridge, and Harold A. Lockhart, Wauconda, Ill., assignors to Bell & Gossett Company, a corporation of Illinois
Filed Apr. 24, 1959, Ser. No. 808,790
9 Claims. (Cl. 103—87)

This invention relates to motor pump units and, more particularly, is concerned with units of this type employing centrifugal pump constructions made up of stamped parts.

The use of stamped parts in a mass-production item of this type is advantageous because tremendous savings in labor and materials can be realized.

The pricipal object of the present invention, therefore, is to provide a low-cost, quiet-running, readily serviceable motor pump unit that incorporates a novel arrangement of interfitting stamped parts that are readily fabricated and assembled by mass-production techniques.

In the illustrated embodiment of the invention, a booster pump of the centrifugal type has its impeller mounted on a pump shaft for rotation inside a cup-shaped pump housing that receives a metal stamping in press-fit relation therein to define a partition wall that divides the housing into a suction intake chamber and a pressure chamber. The shaft projects through an end plate for the housing and is journalled in a bearing assembly cooperatively carried by the pump housing and a mounting bracket that connects between the motor and the pump housing. The motor shaft is drivingly connected to the pump shaft through a flexible coupler arrangement of improved construction. With the exception of the shaft, stamped parts are employed for all of the above components and the stampings interengage in properly centered relation to allow quick assembly.

In addition, the parts may be formed into convenient subassemblies to facilitate dismentling of the unit for repair or replacement of one or more components.

Further features of the invention reside in the construction of the impeller and in a forced-air cooling arrangement that is incorporated in the pump unit.

Other objects and advantages will become apparent during the course of the following description.

In the accompanying drawings forming a part of this specification and in which like numerals are employed to designate like parts throughout the same:

Figure 1:
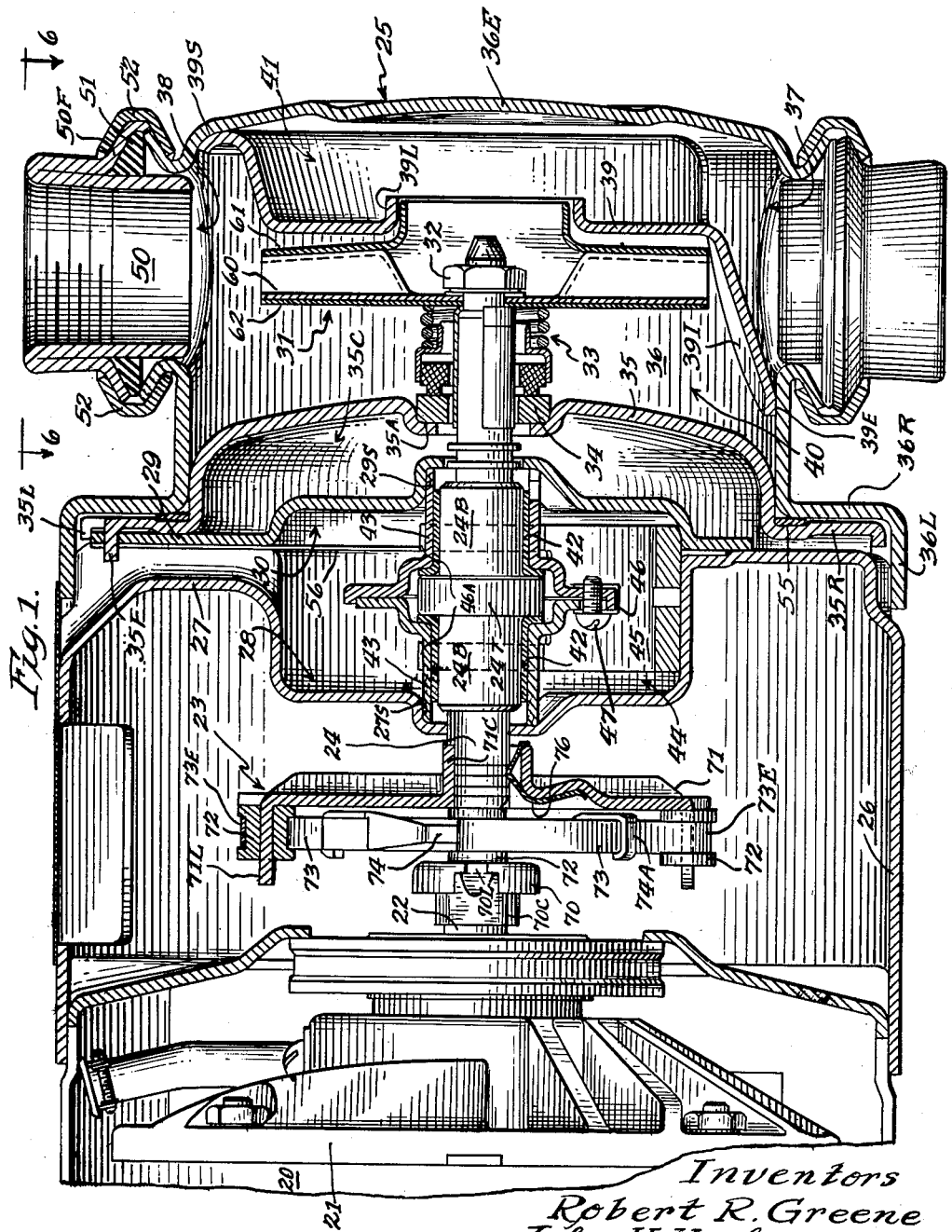
FIG. 1 is a fragmentary longitudinal sectional view through the motor pump unit of the invention.

Referring now to FIG. 1, an assembled motor pump unit of this invention is illustrated for purposes of disclosure with the motor 20 shown fragmentarily as including an end bell 21 and an output shaft 22 that has driving connection through a flexible coupler assembly 23 to the shaft 24 of a pump unit 25. A mounting bracket 26 is carried from the motor frame; and, as may be seen by reference to FIGS. 1 and 2, the bracket 26 has an integral end wall 27 formed with a suitable recess to define a bearing chamber 28. End wall 27 serves as a rear bearing support wall. A separate plate 29 has a complemental recess to define a cooperating bearing chamber 30 with plate 29 serving as the front bearing support wall.

The free end of the shaft 24 carries an impeller assembly 31 secured to the shaft by a threaded nut 32 with a conventional seal ring assembly 33 being disposed in surrounding relation on the shaft for rotary movement therewith to maintain sealing cooperation with a suitable seal ring 34 that is stationarily disposed in an annular seat provided in a dish-shaped seal plate 35.

The seal plate 35 forms one end wall of the pump housing, the remainder of which is provided in the form of a cup-shaped pump body 36 that is formed with intake and discharge outlets 37 and 38, respectively, with a suction shroud plate 39 disposed within the pump body and forming a partition wall therein to define a pressure chamber 40 and a suction intake passage 41 that opens into the eye of the impeller assembly 31.

Figure 7:
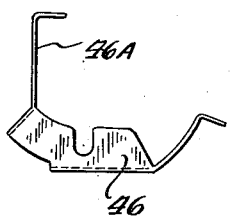
FIG. 7 is a detailed side-elevational view of the oil wick retainer clip for the bearing cartridge.

The shaft 24 is machined to provide an intermediate thrust collar 24T flanked by cylindrical bearing surfaces 24B which ride in split-ring bearing inserts 42 that are fixed within complemental stepped bearing support tubes 43 carried in accurate alignment in the bearing pockets provided by the bearing support walls 27 and 29. These bearing support walls are cooperably positioned to define a bearing chamber 44 having a lubricant well provided with a bearing wick 45 suitably fixed therein by a spring clip 46 (see FIG. 7) that straddles the abutting edges of the bearing support tubes 43 and includes resilient arms 46A that bias the upper ends of the wick into lubricating position alongside the shaft bearing surfaces 24B. The clip 46 is secured in place by a suitable mounting screw 47.

Figure 2:
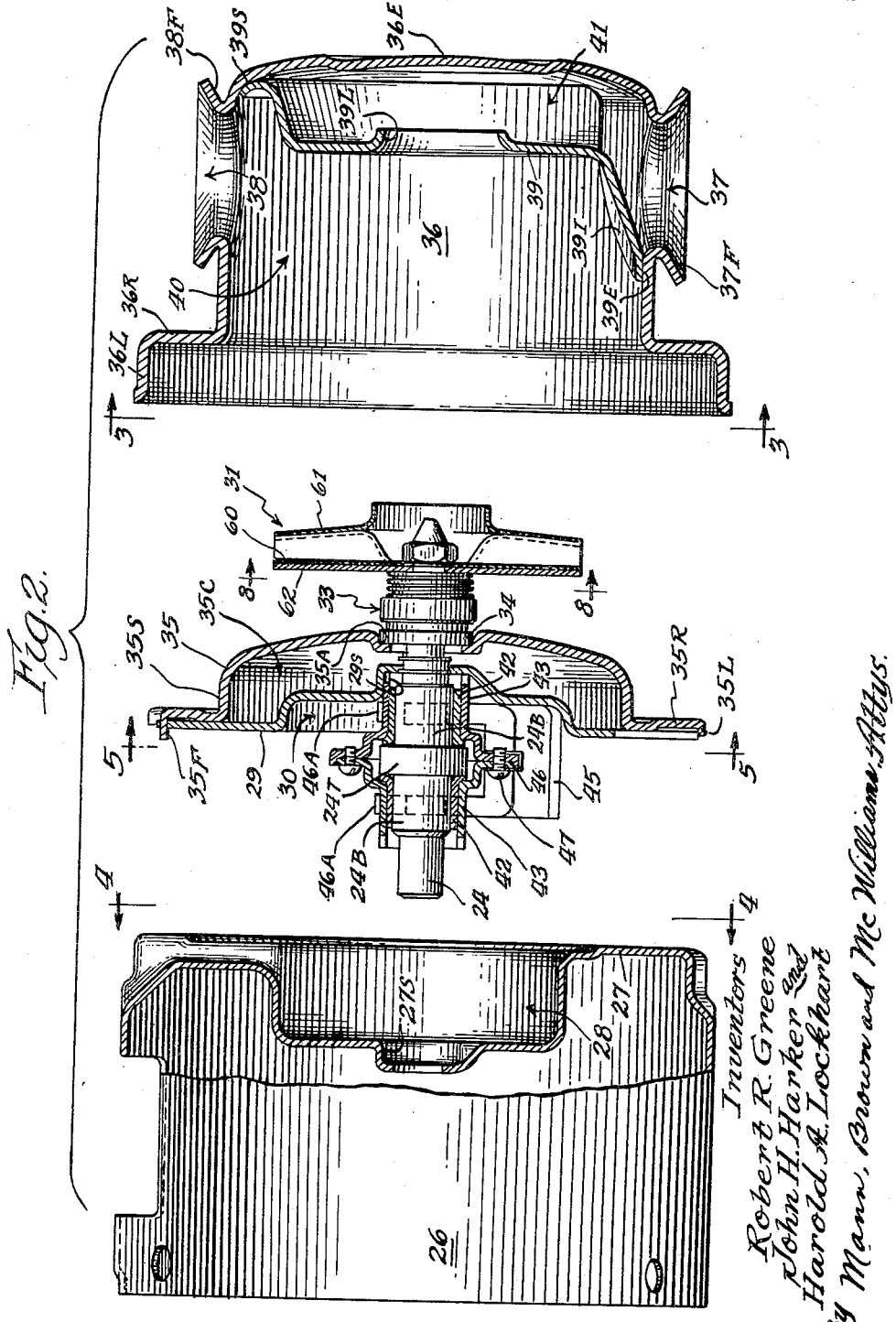
FIG. 2 is an exploded longitudinal sectional view of the components of the pump unit illustrating the major subassemblies of the preferred constructional embodiment.

One of the features of the invention resides in the fact that the pump components are arranged in convenient subassemblies. This facilitates dismantling of the unit for repair or replacement and, as is illustrated in FIG. 2, three principal subassemblies are provided: the pump housing assembly, which includes the pump body 36 and a suction shroud plate 39; the replaceable bearing cartridge and impeller assembly; and the mounting bracket and motor assembly. The units most frequently requiring replacement are the bearing and the shaft seal, and access may conveniently be had to either of these for replacement or repair simply by removing the pump housing, which is bolted in place, and withdrawing the bearing cartridge and impeller assembly as a unit. If desired, this entire unit may be renewed, and it will become apparent that the construction employed in accordance with this invention will permit such replacement at extremely low cost. It will be apparent that the impeller and sealing assembly may be removed from the shaft simply by removing the attachment nut 32 if a partial repair or replacement is involved. The construction of the various parts of the pump permits their convenient assembly in properly aligned position so that field replacement of one or more parts is feasible.

It is now desirable to point up the novel features residing in the general arrangement and construction of the stamped centrifugal pump of this invention. The resultant product is extremely lightweight and inexpensive to produce. Great economies in terms of reduced labor and material costs are achieved in the mass production of the unit. The stamped construction lends itself to mass-production techniques, and the arrangements shown herein ensure proper fits and proper tolerances between the various parts and thereby facilitate assembly line operations.

Figure 3:
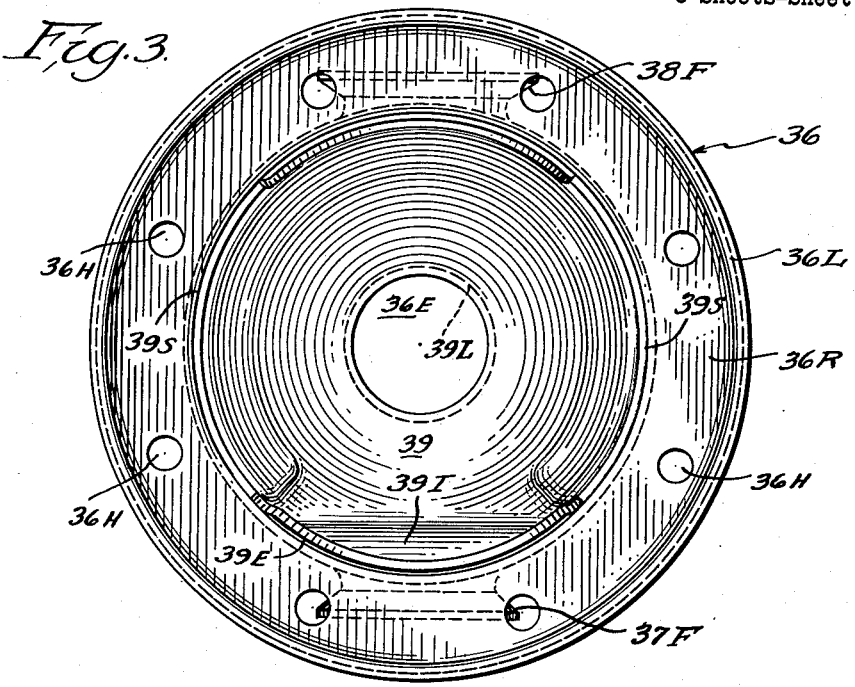
FIG. 3 is a rear end elevation view of the pump housing and suction shroud plate assembly and is taken as indicated at 3—3 in FIG. 2.

Referring now more particularly to FIGS. 2 and 3, it will be seen that the pump body 36 is constructed to facilitate its formation by a series of conventional stamping operations. The pump body comprises a main section, preferably of cylindrical cross-sectional configuration to form a cylindrical pump cavity, one end of which is closed by an integral end wall 36E and the other end of which is open and surrounded by an integral wall section that extends radially outwardly from the main section to provide an abutment rim 36R and then endwise from the outer margin of the rim to provide an attachment lip 36L. The inlet and outlet openings, through the side wall structure of the main section of the pump body, are surrounded by integral attachment flanges 37F and 38F, respectively, each of which is in the form of an outwardly flaring annular lip to facilitate connection with external piping.

Figure 6:
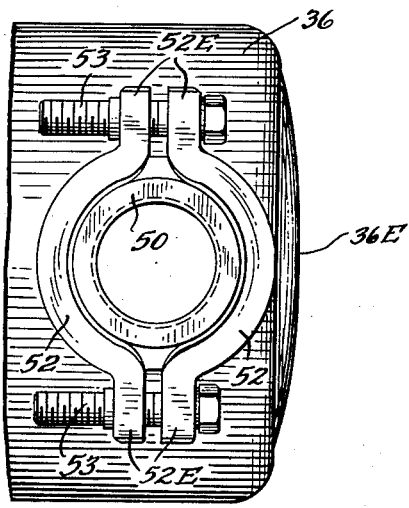
FIG. 6 is a fragmentary detailed elevational view of the clamping arrangement for facilitating connection of the pump housing to the external supply lines.

In the preferred constructional embodiment and as best seen in FIGS. 1 and 6, each of the inlet and outlet piping terminations for the pump preferably include an internally threaded tubular adapter nipple 50 insertable in the opening and having an integral attachment flange 50F in the form of an outwardly flaring lip exending generally towards the corresponding attachment flange on the pump body with a ring gasket 51 encircling the nipple at its inner end for compression between the cooperating flanges on the pump body and the nipple in establishing a liquid-tight seal. Mating, semicircular clamps 52 of generally V-shaped cross-sectional configuration are assembled around the adjacent edges of the attachment flanges and held together by tension bolts 53 secured through integral end extensions 52E of the clamps for drawing the attachment flanges against the ring gasket in directions axially of the nipple.

The suction shroud plate 39 is also constructed to facilitate its fabrication by a series of conventional stamping operations and it includes an edge surface 39S contoured for snug-fitting, sealing cooperation against the end wall 36E of the pump body to form a partition wall that separates the inlet and outlet openings of the pump. Since these inlet and outlet openings are both located in the side wall structure in the illustrated embodiment, the suction shroud plate has an axially offset inlet shroud section 39I extending towards the open end of the pump cavity to enshroud the inlet opening of the pump. The irregular marginal edge of this inlet shroud section also has a contoured seal edge 39E shaped for continuous engagement with the adjacent surface of the pump casing to complete the separation of the suction chamber 41 from the pressure chamber 40. Finally, the shroud plate has an annular central lip 39L forming a suction passage for directing incoming liquid from the suction inlet opening 37 through suction chamber 41 and into the eye of the impeller.

Figure 5:
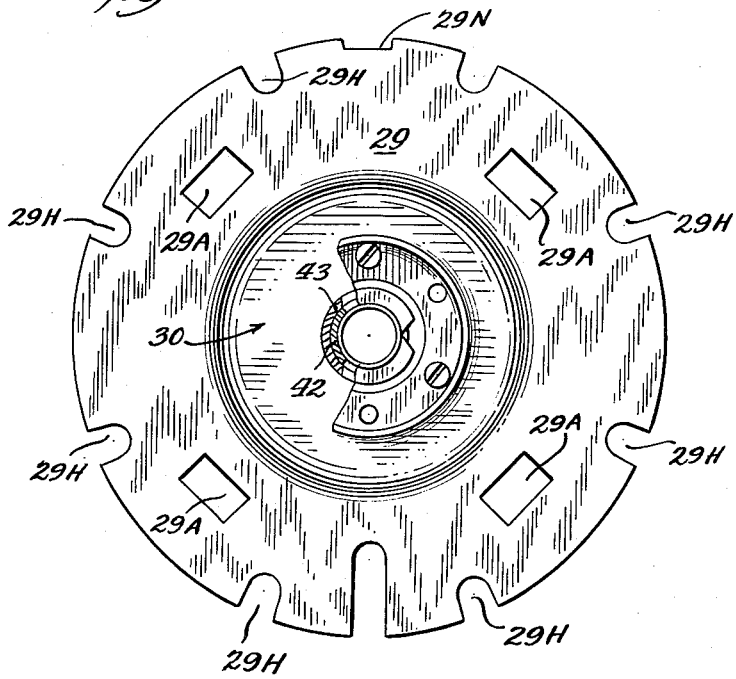
FIG. 5 is a rear end elevational view of the replaceable bearing cartridge and impeller assembly and is taken as indicated by the line 5—5 of FIG. 2 but with the seal plate omitted.

As mentioned previously, the outer end wall of the pump cavity is provided by seal plate 35 and it is of dish-shaped configuration and is arranged to facilitate its formation by a series of stamping operations. The seal plate 35 has an integral abutment rim 35R for locating engagement with the abutment ring 36R of the pump body, while its dish-shaped main section defines an air-circulation chamber 35C for cooling the pump, as will be described hereinafter. The main section of the seal plate has a cylindrical surface 35S shaped for press-fit cooperating centering engagement within the open end of the main section of the pump body. The seal plate 35 has a central shaft opening surrounded by an annular seat 35A that receives the stationary seal ring 34 in press-fit relation. The seal plate also has an endwise bent-over lip 35L about its outer margin defining a shallow mounting socket, with the front bearing support plate 29 being received in press-fit centered engagement therein. An integral locating fin 35F on the seal plate mates with a locating notch 29N provided in the front bearing support plate. The notch 29N is best seen in FIG. 5.

The front bearing support plate is also a permanent part of the bearing cartridge and impeller assembly, and by again referring to FIG. 5, it may be seen that the front bearing support plate 29 is provided with four airholes 29A in open communication with the air-circulation chamber 35C that is defined by the axially spaced apart central sections of the seal plate and front bearing support plate. A central shaft opening for plate 29 is surrounded by a generally cylindrical shoulder 29S which forms a socket for receiving and normally retaining the small end of the outermost bearing support tube 43 in tight press-fit engagement.

Figure 4:
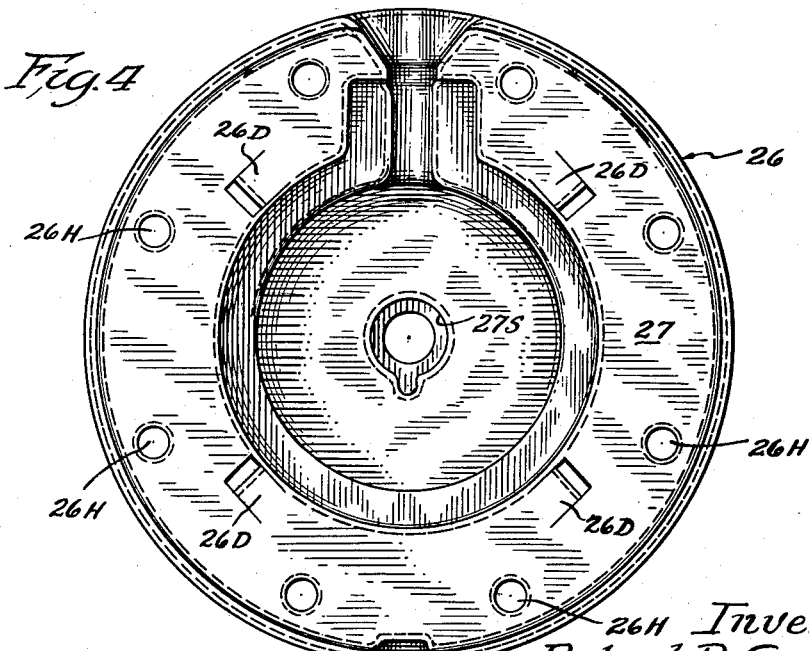
FIG. 4 is a front end elevational view of the pump-mounting bracket and illustrates the bearing pocket and air circulation openings provided by its end wall and is taken as indicated by the line 4—4 of FIG 2.

As best seen in FIGS. 2 and 4, the end wall 27 provided by the mounting bracket 26 has a central shaft opening surrounded by a generally cylindrical shoulder 27S that forms a socket for receiving the small end of the innermost bearing support tube 43 in loose-fit engagement. Since the stepped bearing tubes 43 are tied together by the mounting screw 47 for the wick clip 46, with the outermost tube 43 retained in tight press-fit engagement within the bearing socket provided by the outer bearing support wall and with the innermost tube loose-fitting and freely movable out of its socket, it will be apparent that upon first removing the pump body 36, the bearing cartridge and impeller assembly may readily be withdrawn by an axial pull.

The outermost end of the mounting bracket 26 has a generally cylindrical external surface that projects into the rim wall section of the pump body for locating engagement therewith to center and align the pump body with respect to the mounting bracket. The mounting bracket, the front bearing support wall, the seal plate, and the pump body are all formed with registering holes for receiving a plurality of nut-and-bolt fastener assemblies (not shown) that fix the parts in tight, properly centered engagement. A ring gasket 55 (FIG. 1) is arranged axially between the seal plate rim 35R and the pump body rim 36R and a suitable gasket 56 (FIG. 1) is arranged between the end wall of the mounting bracket and the front bearing support plate. The mounting bracket 26 is at least partially open and the flexible coupler assembly, which rotates during operation, fans the air within the mounting bracket and develops sufficient air movement through the air-circulation chamber. The end wall of the mounting chamber has a plurality of detents 26D (FIG. 4) integrally struck out therefrom to extend in a direction towards the flexible coupler to act as air scoops or deflectors. These air scoops are adjacent the openings 29A (FIG. 5) in the front bearing support plate 29 and pick up the air that is excited by the rotation of the flexible coupler to direct it into the air-circulation chamber.

Variations in the details of the pump construction will occur to those skilled in this art. In one such alternative embodiment illustrated in FIG. 8, corresponding elements of the pump are designated by corresponding reference characters in the 100 series. The differences in construction are apparent from a visual comparison of the arrangement of FIG. 8 with that of FIG. 2, and only the highlights will be mentioned herein.

It will be noted that the pump housing assembly is of the same general form as that of FIG. 2 except that a plate 109 having a circumferential ring of blade walls 109W is included within the pump body 136 in centered engagement therewith, with the blade walls 109W cooperating with the shroud plate 139 and defining a ring of diffusion passages surrounding the impeller periphery in the usual manner. The diffuser plate 109 is provided with a plurality of bolt holes 109B to receive the main fasteners 110 of the pump assembly. The diffuser plate has a substantially cylindrical main section 109M that receives the seal plate 135 in centered, liquid-tight engagement therein.

The seal plate is shaped to form an air-circulation chamber 135C, bounded at one end by a separate support plate 129 that is suitably apertured to provide vent openings (not shown) for the circulation chamber. The support plate 129 includes an integral bearing tube 143 and also supports an inwardly extending shell 111, the central section of which is deformed into tubular shape and constitutes the inner bearing tube 143. The end wall 127 of the mounting bracket 126 has an enlarged central aperture 127A accommodating the shell for attachment to the support plate 129.

Figure 8:
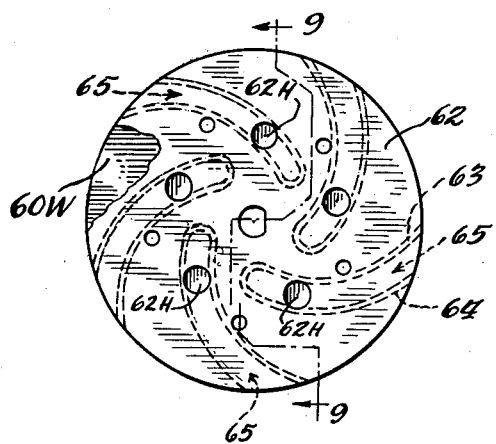
FIG. 8 is an exploded view like FIG. 2 and illustrating an alternative embodiment of a pump of stamped construction.
Figure 9:
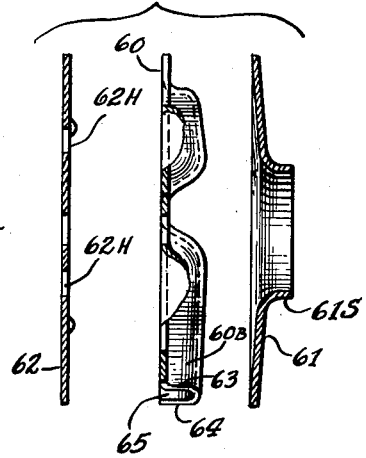
Figure 10:
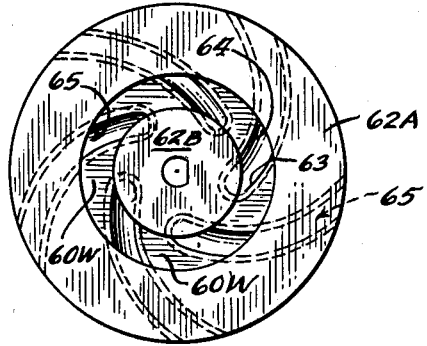
Figure 11:
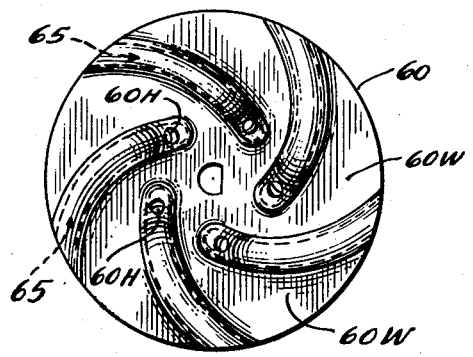
Figure 12:
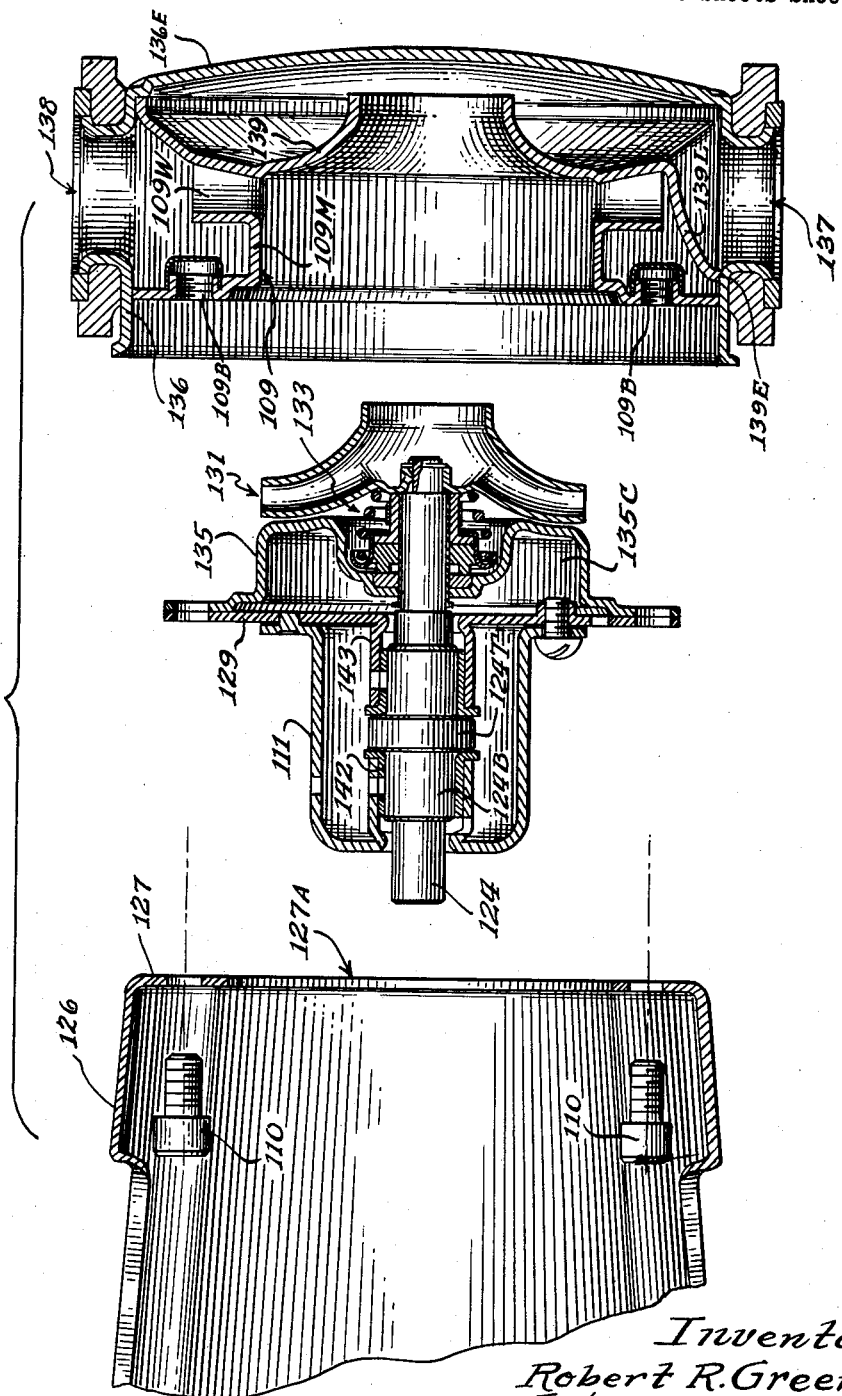

The subassemblies are separately illustrated in FIG. 8 and it will be apparent that the shaft 124, the impeller 131, the seal plate 135 and the bearing support structure are again arranged in a unit subassembly that is readily removable from the pump upon first removing the main pump body 136 from the mounting bracket 126. The subassemblies are readily secured together by means of the fasteners 110 that extend through holes in the end wall 127 of the mounting bracket, the support plate 129, and the diffuser plate 109 to lock the parts in predetermined, centered relationship. The open side wall construction of the mounting bracket affords access to the fasteners. The seal plate, which is otherwise free, is in snug-fitting centered engagement within the diffuser. Again the various parts of FIG. 8 lend themselves to fabrication by stamping operations and they are readily assembled to provide a pump construction that is lightweight, low-cost, and highly efficient.

It should be understood that the description of the preferred form of the invention is for the purpose of complying with Section 112, Title 35, of the U.S. Code and that the claims should be construed as broadly as prior art will permit.

We claim:

1. In a centrifugal pump of stamped construction a pump casing including a cup-shaped main body of generally circular cross-sectional configuration, said body being open at one end and being closed at the other end by an integral end wall, said body having a suction inlet and a discharge outlet, a suction shroud plate centered in said body at the closed end thereof and having its marginal edge in liquid-tight sealing engagement with the body and constituting a partition wall between a suction passage communicating directly with the suction inlet and a pressure chamber communicating with the discharge outlet, and a seal plate in snug-fitting, centered engagement in said body across the open end thereof and having a central opening aligned with the suction passage, a bearing support plate in rigid centered engagement with said seal plate and having a central shaft opening, a rotatable shaft projecting through the openings in said seal and support plates and carrying an impeller and seal structure for rotation in said pressure chamber, bearing tube structure rigid with said support plate and rotatably supporting said shaft, and a mounting bracket secured to said main body at the open end thereof to fix said plates in predetermined centered relation to said body.

2. In a centrifugal pump of stamped construction, a pump casing including a cup-shaped main body stamping of generally circular cross-sectional configuration, said body stamping being open at one end and being closed at the other end by an integral end wall, said body stamping having inlet and outlet openings surrounded by outwardly extending integral attachment flanges that are adjacent the closed end thereof, and a suction shroud plate stamping in said body stamping at the closed end thereof to partition the casing into a suction passage communicating directly with the inlet opening and a pressure chamber communicating directly with the outlet opening, said shroud plate stamping having a continuous contoured edge flange providing a continuous generally outwardly facing broad surface in snug-fitting, sealing cooperation with the pump body stamping to retain the shroud plate stamping in the body stamping and isolate the edge regions of the suction passage and pressure chamber.

3. In a centrifugal pump of stamped construction, a pump casing including a cup-shaped main body stamping having surrounding wall structure of generally circular cross-sectional configuration, said body stamping being open at one end and being closed at the other end by an integral end wall, said surrounding wall structure having inlet and outlet openings adjacent said integral end wall, and a suction shroud plate stamping in said body stamping at the closed end thereof and having an offset inlet shroud section spaced from said closed end in a direction lengthwise of the body stamping a greater distance than the remainder of the platestamping to enshroud the inlet opening and partition the casing into a suction passage communicating directly with the inlet opening and a pressure chamber communicating directly with the outlet opening, said shroud plate stamping having its marginal edge in continuous, snug-fitting, sealing cooperation with the pump body stamping to retain the shroud plate in position within the body and isolate the edge regions of the suction passage and pressure chamber.

4. In a motor pump unit that includes a pump casing, a motor-mounted bracket supporting said casing, and a shaft and impeller assembly mounted for rotation in said casing with said shaft projecting through the casing and bracket; the improvement wherein the shaft has a thrust collar externally of said casing, said casing and bracket each having an end wall at adjacent ends thereof, said end walls being aligned and having complemental recesses defining a bearing chamber therebetween, and a separate bearing tube carried by each end wall to project axially in said chamber and supportingly encircle said shaft on opposite sides of said collar.

5. A motor pump unit of stamped construction and comprising a pump casing having an open end, a motor-mounted bracket in releasable supporting connection to said casing at its open end, a replaceable unit assembly removably mounted between said casing and said bracket and including a seal plate engageable with the casing to seal the open end thereof and having a central shaft opening encircled by a seal face, a rotatable shaft projecting through the seal plate, an impeller on the shaft on one side of the seal plate, a seal assembly encircling the shaft between the seal plate and impeller and including a seal face engaging the first-named seal face, and bearing structure rigid with the seal plate and including a bearing tube encircling the shaft on the other side of the seal plate.

6. In a motor pump unit of stamped construction, a pump casing having an open end, a motor-mounted bracket in releasable supporting connection to said casing, and a replaceable unit assembly removably mounted between said casing and said bracket and including a seal plate having centering engagement with the casing to seal the open end thereof and having a central shaft opening encircled by a seal face on one side of the seal plate and an air-circulation chamber on the other side of the seal plate, a rotatable shaft projecting through the seal plate, an impeller of the shaft on said one side of the seal plate, a seal assembly encircling the shaft between the seal plate and impeller and including a rotatable seal face engaging the first-named seal face, and shaft-supporting structure including an apertured support plate rigid with the seal plate and arranged alongside said other side thereof to overlie said chamber and a bearing tube carried by said support plate and encircling and rotatably supporting said shaft.

7. In a motor pump unit that includes a pump casing, a motor-mounted bracket supporting said casing, and a shaft and impeller assembly rotatable in said casing with said shaft projecting through said casing and bracket; the improvement wherein said casing includes a dish-shaped seal plate wall providing an air-circulation chamber at one end of the pump casing and opening away from said impeller assembly and said bracket includes an end wall in aligned, spaced apart relationship to said seal plate wall and spanning the open side of said chamber, said end wall having openings communicating with said chamber, and a flexible coupler assembly for the shaft rotatable within said bracket and having radially projecting portions active upon rotation with said shaft to set up an air-circulation path through the chamber.

8. In a motor pump unit that includes a pump casing, a motor-mounted bracket supporting said casing, and a shaft and impeller assembly mounted for rotation in said casing with said shaft projecting through the casing and brackets; the improvement wherein the shaft has a thrust collar externally of said casing, said casing and bracket each having an end wall at adjacent ends thereof, said end walls being aligned and having complemental recesses defining a bearing chamber therebetween, and a separate multiple piece bearing tube structure having fasteners interconnecting the separate pieces thereof to provide a rigid structure supportingly encircling said shaft on both side of said collar, one end of said bearing tube structure being supportedly engaged in said casing end wall and the other end being supportedly engaged in said bracket end wall.

9. In a motor pump unit of stamped construction, a pump casing member having an open end, a motor mounted bracket member in releaseable supporting connection to said casing, and a replaceable unit assembly removably mounted between said casing and said bracket and having centering engagement with the casing to seal the open end thereof, said assembly including aligned seal and support plates rigidly connected at their periphery and providing an air circulation chamber therebetween, said seal plate having a central shaft opening encircled by a seal face on the side thereof adjacent said casing, a rotatable shaft projecting through the seal plate opening, an impeller on the shaft on the seal face side of said seal plate, a seal assembly encircling the shaft between the seal plate and impeller and including a rotatable seal face engaging the first named seal face, said support plate having apertures opening into said chamber and having a central shaft opening and a bearing tube carried by said support plate in alignment with said shaft openings and encircling and rotatably supporting said shaft.

References Cited in the file of this patent

UNITED STATES PATENTS

| | | |
|---|---|---|
| 2,121,299 | Peters | June 21, 1938 |
| 2,272,454 | Wilfley | Feb. 10, 1942 |
| 2,317,517 | Brace | Apr. 27, 1943 |
| 2,646,001 | Ray | July 21, 1953 |
| 2,692,563 | Kovacs | Oct. 26, 1954 |
| 2,761,707 | Herman | Sept. 4, 1956 |
| 2,766,699 | Bayless | Oct. 16, 1956 |
| 2,784,673 | Namur | Mar. 12, 1957 |
| 2,821,071 | Tetlow | Jan. 28, 1958 |
| 2,878,041 | Hobbs | Mar. 17, 1959 |
| 2,885,871 | Wellauer | May 12, 1959 |
| 2,898,861 | Wakeman | Aug. 11, 1959 |

FOREIGN PATENTS

| | | |
|---|---|---|
| 916,811 | Germany | Aug. 19, 1954 |